(12) United States Patent
Allen et al.

(10) Patent No.: US 7,133,398 B2
(45) Date of Patent: Nov. 7, 2006

(54) SYSTEM AND METHOD FOR ASYNCHRONOUS COMMUNICATIONS EMPLOYING DIRECT AND INDIRECT ACCESS PROTOCOLS

(75) Inventors: Vernon Anthony Allen, Ft. Lauderdale, FL (US); Stephen Raphael Korfhage, Davie, FL (US); Monique Bourgeois Brown, San Jose, CA (US); Edgar Herbert Callaway, Jr., Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 912 days.

(21) Appl. No.: 10/108,116

(22) Filed: Mar. 27, 2002

(65) Prior Publication Data

US 2003/0185170 A1    Oct. 2, 2003

(51) Int. Cl.
 *H04J 3/06* (2006.01)
 *H04J 3/08* (2006.01)
 *H04L 7/00* (2006.01)
(52) U.S. Cl. .................. 370/350; 370/502; 375/356
(58) Field of Classification Search ........... 370/356, 370/503–520, 310–350; 375/356
 See application file for complete search history.

(56) References Cited

U.S. PATENT DOCUMENTS

| | | | | |
|---|---|---|---|---|
| 4,534,061 A * | 8/1985 | Ulug | ............... | 455/17 |
| 5,636,243 A * | 6/1997 | Tanaka | ............... | 375/219 |
| 5,699,409 A * | 12/1997 | Kojima | ............... | 455/434 |
| 6,484,027 B1 * | 11/2002 | Mauney et al. | ............... | 455/421 |
| 6,516,007 B1 * | 2/2003 | Hong et al. | ............... | 370/515 |
| 6,574,266 B1 * | 6/2003 | Haartsen | ............... | 375/133 |
| 6,744,750 B1 * | 6/2004 | Berger | ............... | 370/337 |

\* cited by examiner

*Primary Examiner*—Ricky Q. Ngo
*Assistant Examiner*—Warner Wong

(57) ABSTRACT

A communication access protocol improves the accessibility of devices operating on an asynchronous network (100), while supporting reduced power consumption. The network (100) includes a mediation device (130) for facilitating communications among network devices. Generally, each network device periodically transmits beacon signals to advertise its presence, and listens for communication signals targeted at the network device (532, 534). A device initiating communication with another operates in one of at least two operating modes in order to establish communications (536, 537, 538). In one mode, the initiating device communicates with the mediation device in order to derive timing information for the other device (537). In another mode, the initiating device listens to receive beacon signals directly from the target device in order to synchronize communications with the device (538). The selection of one of the two operating modes depends on a control parameter established for the initiating device, which in one embodiment is dependent on the urgency of communication, a maximum number of retries for using the mediation device, or the like.

10 Claims, 4 Drawing Sheets

SYSTEM AND METHOD FOR ASYNCHRONOUS COMMUNICATIONS EMPLOYING DIRECT AND INDIRECT ACCESS PROTOCOLS

FIELD OF THE INVENTION

The present invention relates generally to communication networks and more specifically to the use of multiple access protocols in asynchronous communication networks.

CROSS REFERENCE TO RELATED APPLICATION

This application is related to the application entitled "A Multiple Access Protocol and Structure for Communication Devices in an Asynchronous Network" and assigned Ser. No. 09/803,322, and to the application entitled "Beacon Assisted Hybrid Asynchronous Wireless Communications Protocol" and assigned Ser. No. 10/022,964.

BACKGROUND OF THE INVENTION

Conventional wireless networks often utilize a synchronous communication protocol that enables network devices to communicate with each other using known or derived timing information. Such network devices are able to operate in a power efficient manner by communicating with each other using the timing information, and by otherwise operating in a sleep or other reduced power consumption mode. However, networks designed to operate using a synchronous communication protocol typically require access to centralized timing information, such as would be provided by infrastructure equipment, which adds cost and complexity.

Wireless networks that utilize an asynchronous communication protocol provide an alternative to the above-mentioned conventional synchronous wireless networks. Such networks are configured to enable associated network devices to communicate directly with one another through, for example, an ad hoc network. Because the network devices communicate directly with one another, the devices need not synchronize with a centralized timing system. Asynchronous transmission is generally used when low power devices make up the network. These low power devices can use a low communication duty cycle frame structure in order to minimize the amount of power used while not actively communicating with other network devices, but the use of a low communication duty cycle frame structure often implies that device availability is reduced. In wireless communication networks, a fundamental challenge is maintaining high availability communications while using low power wireless communication devices.

To lower power consumption, it is important to reduce the average communication duty cycle of all the devices in the network. The average communication duty cycle refers to the fraction of time that the wireless device is able to send and receive messages. For a given asynchronous network, the average communication duty cycle may be set so low that the infrequent communications between a transmitter and a target receiver become a problem. For example, a device A may attempt to contact another device B, but device B may be not be able to receive messages due to its low average communication duty cycle. This may prevent device A from establishing contact. A configuration change that increases the duty cycle of device A and/or device B would ordinarily result in an increase in power consumption.

It is desirable to provide for a communication protocol that improves the accessibility of devices operating on asynchronous networks without the traditional infrastructure that typically provides synchronization. Accordingly, a new access protocol is needed.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENT

The present invention provides for an asynchronous network with a communication access protocol that improves the accessibility of devices operating on the network, while supporting reduced power consumption. The asynchronous network is provided with a mediation device for facilitating communications among network devices. According to the protocol, each network device periodically transmits beacon signals that advertise its presence, and listens for communication signals targeted at the network device. A device initiating communication with a target device operates in one of at least two operating modes in order to establish communications. In one operating mode, the initiating device communicates with the mediation device, such as by a communication request or otherwise, in order to derive timing information for the target device. In the other operating mode, the initiating device listens to receive beacon signals directly from the target device in order to synchronize communications with the device. Preferably, the selection of either of the two operating modes depends on a control parameter established for the initiating device, which control parameter may be dependent on the urgency of communication, a maximum number of retries for using the mediation device, or other criteria.

It is understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
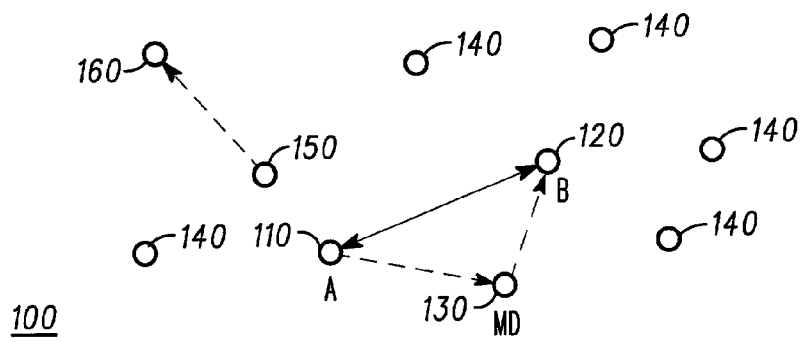
FIG. 1 shows an asynchronous network containing several low power communication devices, in accordance with the present invention.

According to the invention, FIG. 1 shows an asynchronous network 100 containing several low power communication devices, in accordance with the present invention. Some devices 110, 120, 130, 150, 160 are shown in an active communication mode, while other devices 140 are shown operating in a sleep mode. During normal asynchronous network operation, each network device has a low communication duty cycle frame structure. As shown, network device 130 is functioning as a mediation device. For the purposes of illustrating the invention, the term mediation device, abbreviated herein as "MD", is used to describe a network device operating in a manner that facilitates communication between other network devices. In the preferred embodiment, the MD is capable of recording and playing back message related information, and providing timing and contact information regarding a particular network device. This is useful when one network device needs timing information concerning another network device, in order to synchronize communications. The MD has a relatively high availability as compared to other devices in the network and is thus able to store and forward messages between two or more devices in the asynchronous network. In one embodiment, several devices operate in turn as a MD within the asynchronous network to balance power consumption. However, in other embodiments, a dedicated device performs the MD function, particular when this device has access to a more substantial power supply. The communication duty cycle of a particular network device may be adapted to the design parameters of the network, so that changing the parameters of the MD has an impact on the availability of each network device within communication range of the MD.

Figure 2:
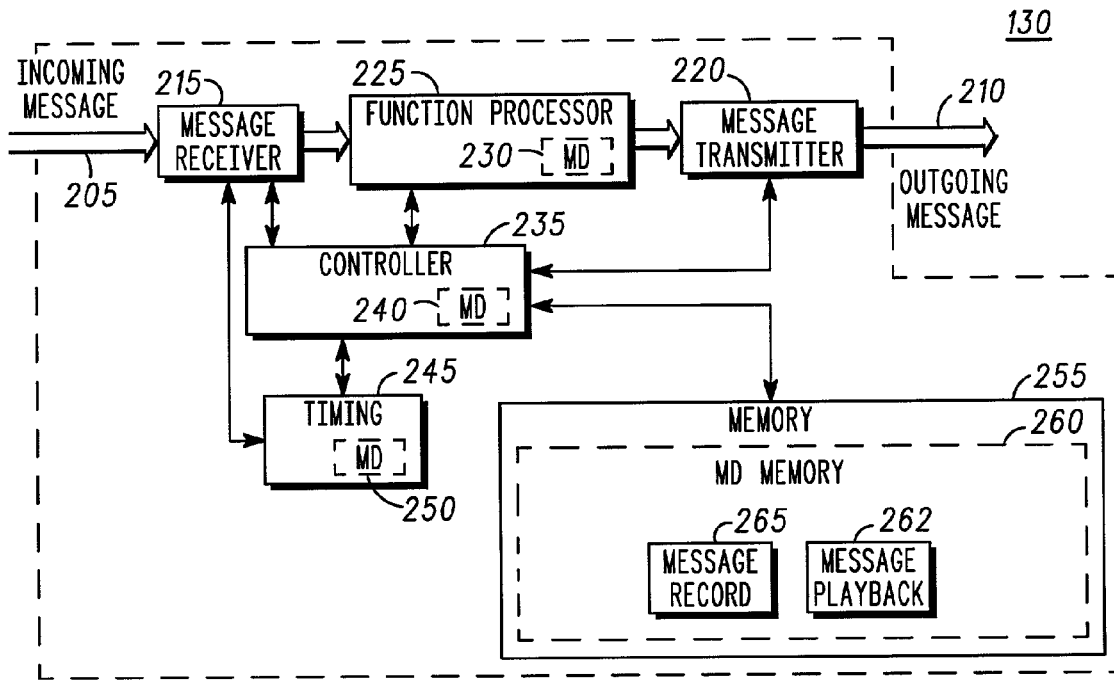
FIG. 2 shows a system level block diagram of a mediation device operating in the network of FIG. 1, in accordance with the present invention.

FIG. 2 shows a system level block diagram of the mediation device 130, in accordance with the present invention. In the device 130, a message receiver 215 receives incoming messages 205 and provides information to a function processor 225. The function processor 225 includes components particular to the overall function of the device, such as components for sensing, measuring, monitoring, control, and/or other functions. A message transmitter 220, coupled to the function processor 225, provides the capability of transmitting data pertaining to device function or other communication requirements as needed. A timing module 245 provides information for communication, synchronization, and other device functions. A memory module 255 stores operating instructions and data for the device, and a controller 235 provides overall control for the device. The device 130 also includes components or functionality specifically for supporting MD activities. For example, the function processor 225, the controller 235, the timing module 245, and the memory module 255, all contain components 230, 240, 250, 260, specifically geared toward supporting the MD functionality. The memory 255 includes message record instructions 265, and message playback instructions 262 to allow the device 130 to function as a communication activity coordinator. Using the message record and playback instructions 265, 262, the device, when operating as an MD, can mediate requests from network devices within the network by recording messages, playing back messages, and saving and providing network device contact and timing information.

In general, the device 130 is capable of supporting specialized functionality for sending and receiving several types of MD messages, including the source network device identifier, the destination network device identifier, the message, time of desired communication, message replay requests, control words, and device status messages. This specialized functionality is in addition to the normal operational mode representative of the plethora of low power network devices in the network. One skilled in the art will recognize that the functional blocks illustrated with respect to device 130 may be modified or combined without departing from the spirit and scope of a low power network device that sends messages, receives messages, and processes messages. In particular, it should be noted that the MD functionality might be further combined or isolated from the non-MD operation of network device 130, so long as the device 130 is operable as a MD on the network.

Figure 3:
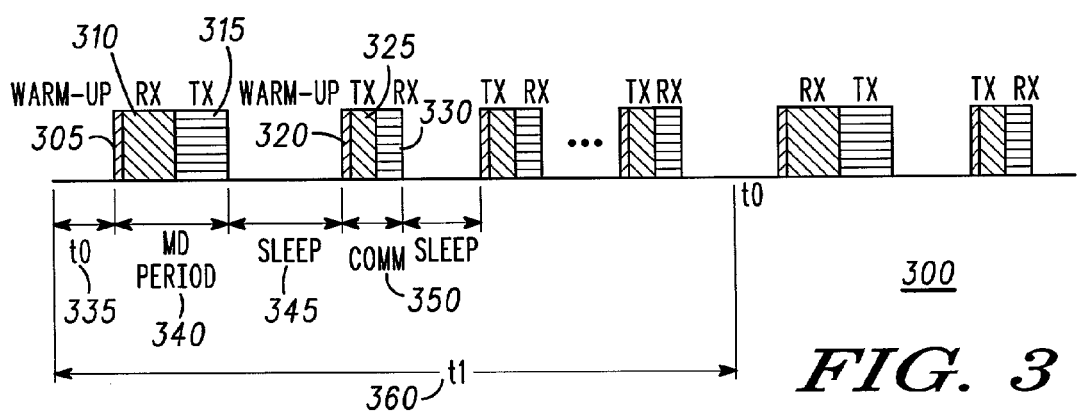
FIG. 3 shows a representative low communication duty cycle frame structure of the mediation device, in accordance with the present invention.

FIG. 3 shows a timing diagram representative of a low communication duty cycle frame structure 300 of mediation device 130, in accordance with the present invention. Low communication duty cycle frame structure 300 contains a periodic super frame sequence 360. Super frame 360 contains a plethora of modes. A first mode of the plethora of modes of a super frame 360 is a random delay t0 block 335; the random delay has duration t0, where t0 is between 0 and the duration of a single transmit or receive period. This delay randomizes the start time of each MD mode, so that the probability of multiple devices concurrently functioning as a mediation device is reduced. A MD mode 340 occurs next chronologically, which contains a warm-up block 305, a receive slot 310 and a transmission slot 315. Warm-up block 305 is a very small percentage of the overall MD mode. In the preferred embodiment, a receive slot 310 precedes a transmit slot 315, although the order could be switched. Also, one of ordinary skill in the art will recognize that MD block 340 could contain several transmit and receive slots in various arrangements. Also, although transmit slot 315 occurs directly before or directly after receive slot 310, the hardware contained in the transmitter and receiver will require some time to switch between transmit and receive modes. The duration of the switching time can be dependent on the switching speed of the hardware in the communication devices, or it could be determined by a parameter in the communication device processor.

After the MD mode 340 ends, a sleep mode 345 begins. In the preferred embodiment, the sleep block 345 is less than the duration of the receive period 310 of the MD mode 340. After the sleep mode 345 ends, a non-MD communication mode 350 begins. The communication mode 350 further contains a warm-up block 320, a transmission slot 325 immediately followed by a receive slot 330. The communication block 350 has a very small duration when comparing with the duration of a sleep mode 345. At the end of the communication block 350, the mediation device 130 repeats the sleep mode 345 and the communication mode 350 until the end of the super frame 360.

At the conclusion of the first super frame, the entire framing sequence just described is repeated until mediation device 130 stops functioning as a communication device. The decision to stop functioning as a communication device is made solely by the mediation device 130 in the preferred embodiment, although it is also possible to coordinate the role of MD among several mediation devices. Note that mediation device 130 contains the ability to generate and store random or pseudo-random numbers. These numbers could be generated by MD processor 230, and stored in the MD memory 260.

Figure 4:
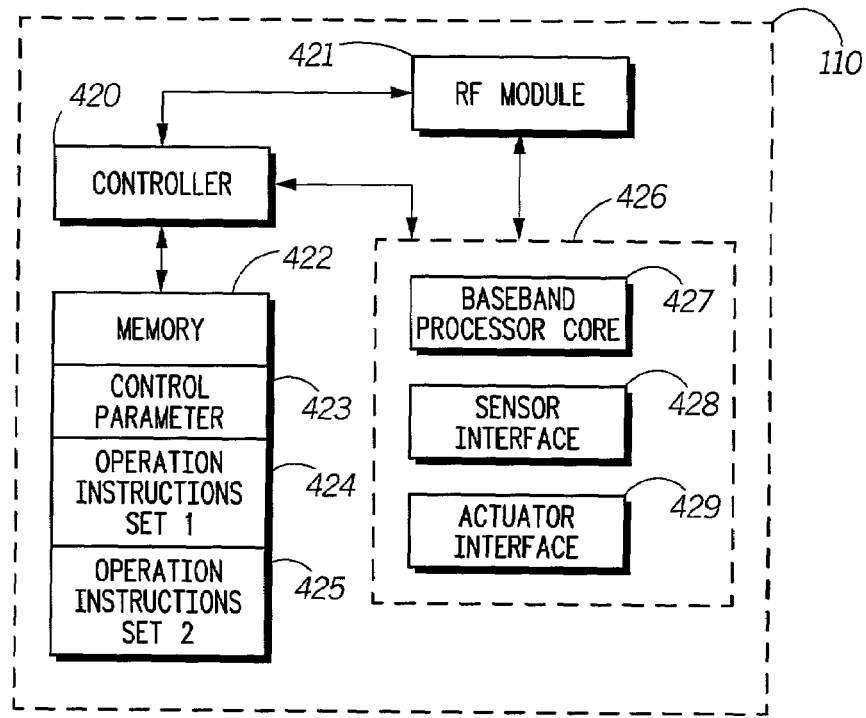
FIG. 4 shows a block diagram of a typical network device, in accordance with the present invention.

FIG. 4 shows a block diagram of the network device 110, in accordance with the present invention. Other network devices 120, 150, 160 are similarly structured. The network device 110 includes a radio frequency (RF) communication module 421, a functional module 426, and a memory module 422, all coupled to a controller 420 for overall control purposes. The functional module 426 includes an actuator interface 429 to actuate, for example, an air vent controller, and a sensor interface 428 for sensing, for example, air temperature at or near the air vent controller in an HVAC-specific application. However, the above components and application are only exemplary in nature, as specific components will vary depending on the specific application. A base-band processing core 427 generates instructions for the actuator interface 429 and the sensor interface 428 based on data received from an RF module 421. The RF module 421 includes a receiver (not shown) with an A/D converter (not shown) for converting RF signals received from other network devices for input into the base-band processing core 427 so that the base-band processing core 427 can, if necessary, generate instructions for the actuator interface 429 that are responsive to the received RF signals. The RF module 421 also includes a transmitter (not shown) with a D/A converter (not shown) and is for transmitting RF signals to other network devices based on instructions received from the base-band processing core 427. The memory 422 includes a memory store for a control parameter 423, and at least two sets of operation instructions 424, 425 that control the method of obtaining timing information for communicating with other devices. The first set of operational instructions 424 governs interaction with a mediation device. The second set of operational instructions 425 governs a procedure for directly interfacing with another network device to obtain timing information communication with the other network device. The control parameter 423 preferably governs a maximum number of attempts at obtaining timing information through the mediation device prior to going into a direct access mode, i.e., an active listen and receive mode to await communication directly from the target device.

Figure 5:
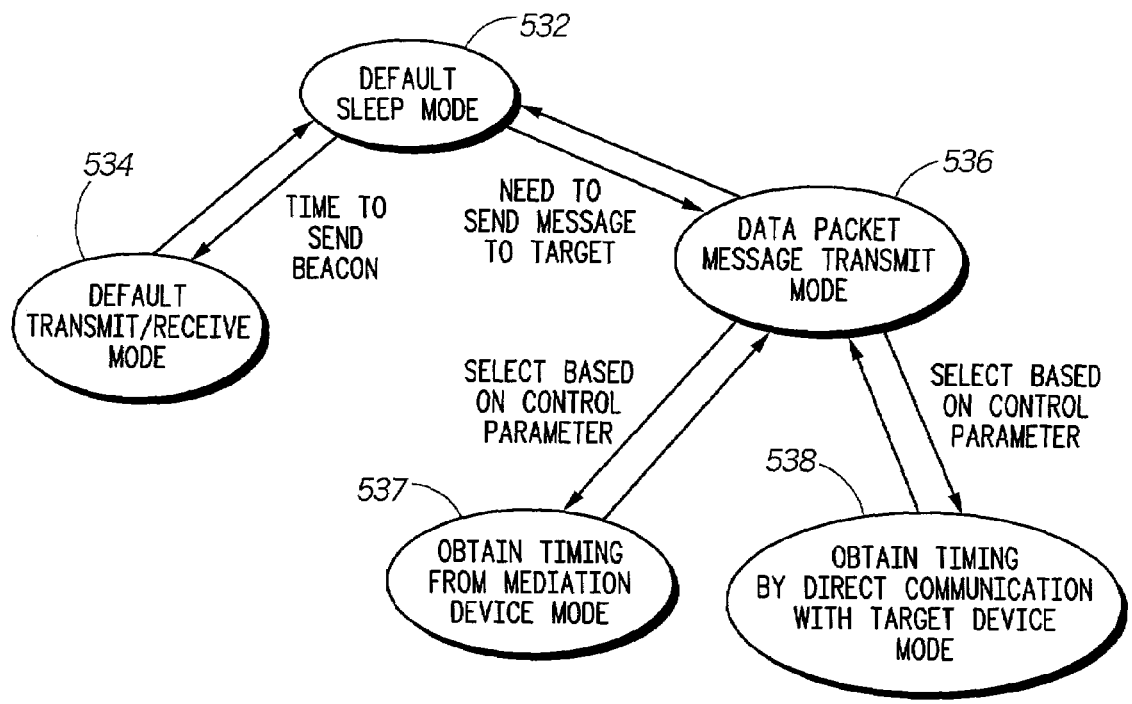
FIG. 5 shows a flow diagram highlighting operational characteristics of the network device, in accordance with the present invention.

FIG. 5 shows operational characteristics of the network device 110, in accordance with the present invention. Although operation of the network device 110 will be referred to hereinafter for purposes of discussion, it should be appreciated that the other network devices 120, 140, 150, 160 have modes of operation that are essentially identical. As shown, the network device 110 generally remains in a default sleep mode at 532, except to periodically wake up to operate in one of two modes: a default transmit/receive mode indicated at 534, and a data packet message mode indicated at 536. More specifically, the network device 110 will automatically wake up to operate in the default transmit/receive mode at 534 by transmitting a beacon signal, and by listening for and possibly receiving beacon signals or data packet messages from, the other network devices. A beacon signal generally includes basic network device identification information and tells receiving or target network devices that the transmitting, or initiating, network device is going into a receive mode. If, however, the network device 110 needs to transmit a data packet message that includes short burst information such as, for example, temperature sensor or security node information, the network device 110 will wake up and go into the data packet message mode 536 rather than the default transmit/receive mode 534. When in the data packet message transmit mode 536, the network device needs to transmit its data at a time when the corresponding target device is in a data receive mode. In order to obtain this timing information, the network device selects from one of two modes 537, 538 based on a control parameter. When in the first mode 537, the network device obtains the timing information from the mediation device, and when in the second mode 538, the network device obtains the timing information by direct communication with the target device.

Figure 6:
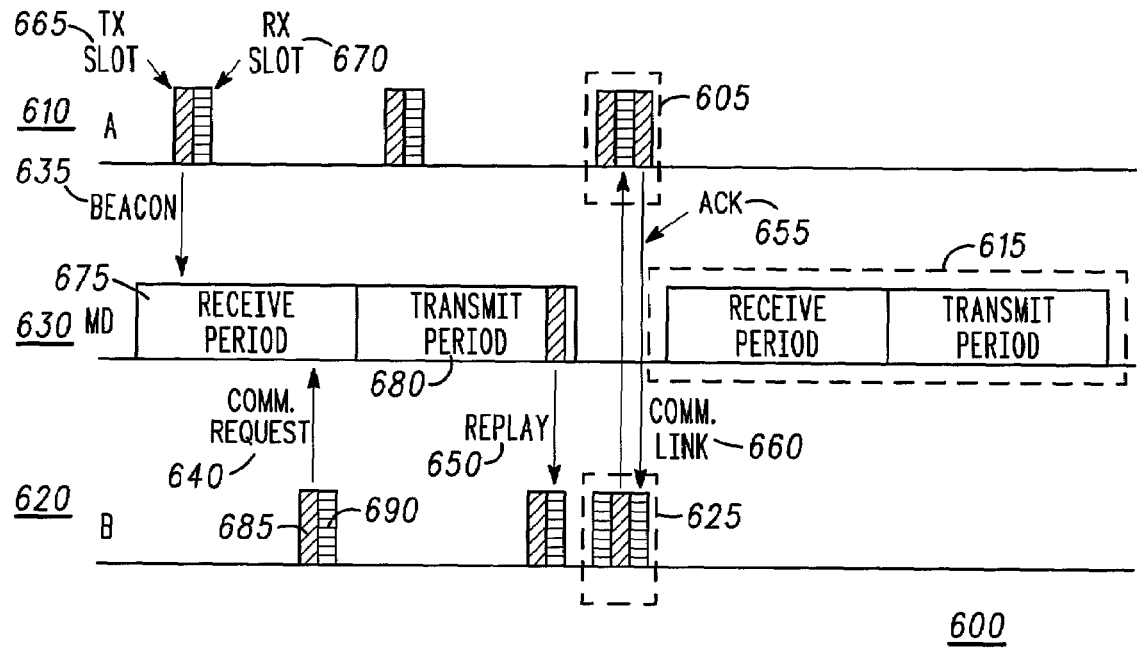
FIG. 6 shows a detailed timing diagram for a network device obtaining timing and contact information from a mediation device, in accordance with the present invention.
Figure 7:
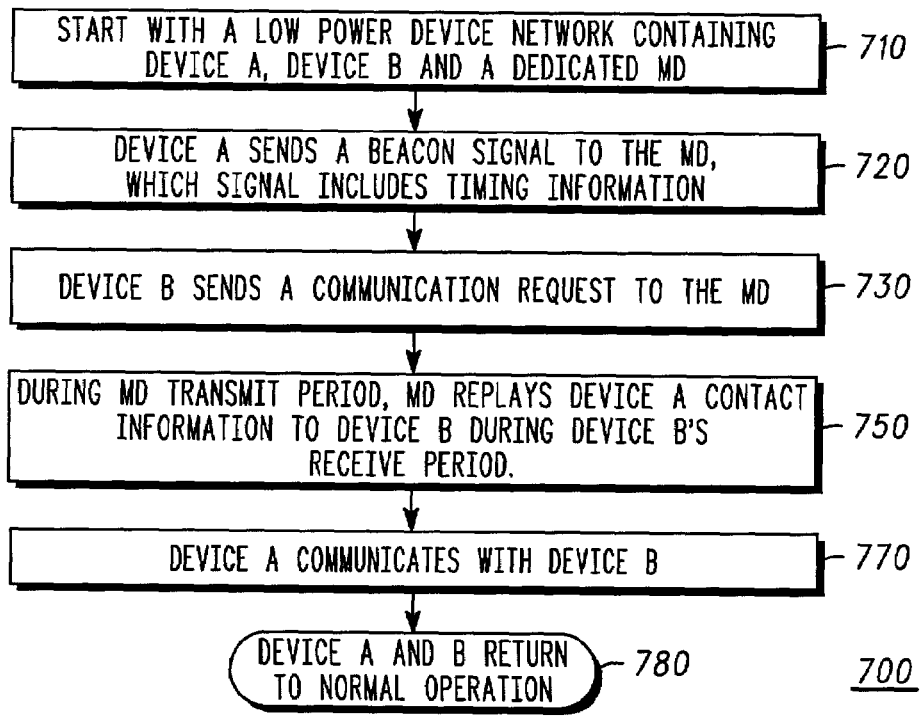
FIG. 7 is a flowchart describing procedures associated with the timing diagram of FIG. 6.

FIG. 6 shows a detailed timing diagram 600 for a network device obtaining information from a mediation device (MD), concerning timing and contact information for another device, in accordance with the first mode 537 described with respect to FIG. 5. FIG. 7 shows a flowchart 700 describing the associated procedures. For the purposes of this discussion, the target device is designated as device A 610, and the initiating device designated as device B 620. Device A 610 has a low duty cycle with a communication period containing a transmit slot 665 and a receive slot 670. Device B 620 also has a low duty cycle with a communication period containing a transmit slot 685 and a receive slot 690. The MD 630 contains a communication period that is much longer than either communication period of device A 610 or device B 620. The communication period of the MD 630 similarly contains a receive slot 675 and a transmit slot 680. With reference to step 710, the network has device A 610, device B, and the MD 630 operating within communication range of each other. Device A 610 sends a beacon signal 635 that includes timing and synchronization information to the MD 630 during the transmit slot 665 of the communication period of device A 610, step 720. In an alternative embodiment, the MD 630 derives timing and synchronization information through other means. The beacon signal 635 is received by the MD 630 during the receive slot 675 of the communication period of the MD 630. Also during the receive slot 675, device B 620 wakes up, enters its communication period, and wishes to communicate with device A. Device B 620 sends a communication request 640 using transmit slot 685 to the MD 630 to obtain timing information for device A, step 730. Note that the MD's extended availability enables both device A 610 and device B 620 to both communicate with the MD 630 during a single receive slot 675. The duration of transmit slot 675 and slot receive 680 of the MD 630 should be chosen large enough that the MD 630 is able to receive both communication requests and periodic beacon signals. The MD 630 then sends a replay message 650 to device B 620 during the same transmit slot 680 of the communication period of the MD 630, step 750, which includes timing and synchronization for communication with device A. Device B 620 now has enough information to enable communication with device A 610 without the use of the MD 630. In order to synchronize with device A, device B uses the timing information provided by the MD 630, and swaps communication slots so that the transmit slot 685 coincides with the receive slot 670 of device B 620. Device B 620 then communicates a message 660 to device A 610 during the transmit slot 685 of device B 620 and the receive slot 670 of device A 610, after which device B initiates a receive period to collect an anticipated acknowledgement 655 from device A, step 770.

Once the communication between device A 610 and device B 620 is complete, device A 610 and device B 620 return to normal operation, step 780.

Figure 8:
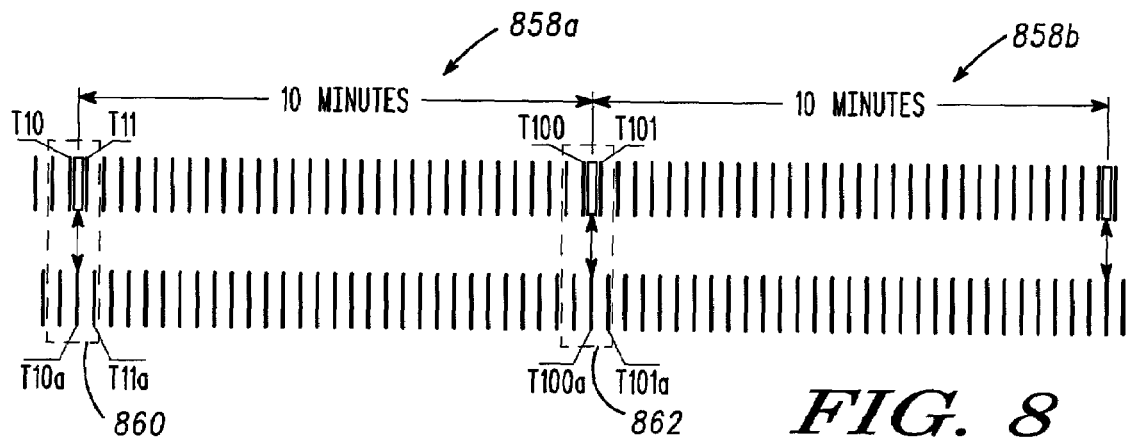
FIGS. 8–10 are timing diagrams illustrating the transmit and receive time periods and corresponding beacon and message transmissions of wireless network devices during a data packet message mode of operation using the beacon assisted hybrid asynchronous protocol according to a preferred embodiment of the present invention.
Figure 9:
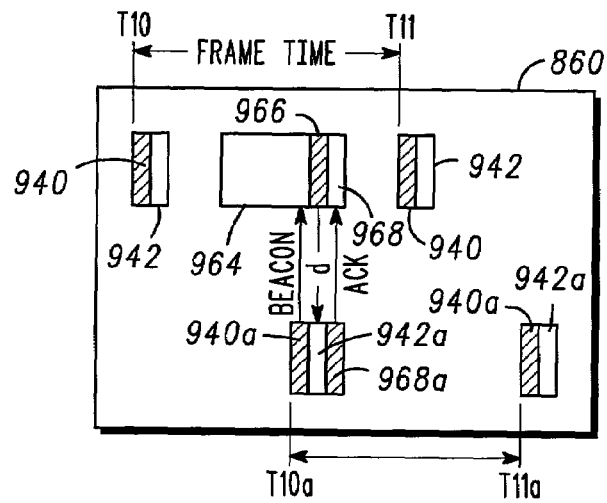
Figure 10:
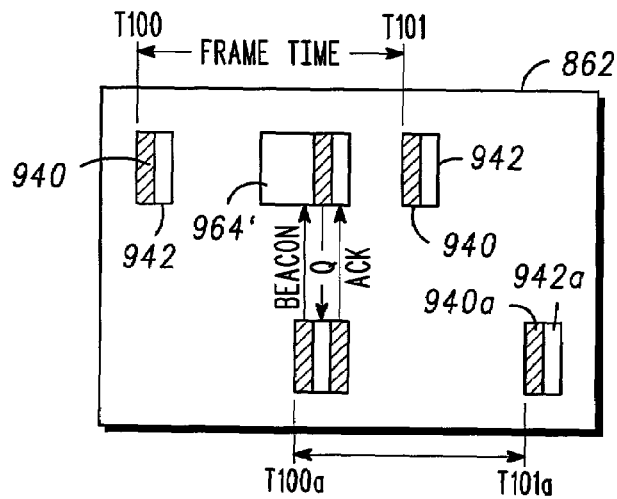

FIGS. 8, 9, and 10 show a set of timing diagrams to illustrate the manner in which one network device, the initiating device, listens and waits to receive beacon signals from another, the target network device, in order to derive timing information for enabling communications, in accordance with the second mode 538 described with respect to FIG. 5. As shown in FIG. 8, both the initiating and target network devices wake up for respective beacon transmit and receive periods, shown generally at 858a, 858b, respectively, on a frame by frame basis, such as during exemplary frames T10, T11 and T10a, T11a, respectively. FIG. 9 is an enlarged snapshot of the sequential frames T10, T11 of the initiating network device, and T10a, T11a of the target network device as shown generally at 860 in FIG. 8. Here, the initiating network device wakes up or becomes active during the frame T11 to listen for or wait to receive a beacon signal transmitted during the frame T10a from the target network device. At this time, the initiating network device has no information about the timing of the beacon transmitted by the target network device and therefore must wake up and turn on its receiver during an extended beacon receive period 964 until it receives the beacon from the target network device.

Once the initiating device receives the beacon signal from the target network device, the initiating network device stores timing information associated with the beacon signal for use in subsequent communications with the target network device, and sends a data packet message to the target network device immediately after the beacon receive period 940 ends during a data packet message transmit period 966. In this case, the initiating network device knows that the target network device initiates a receive time period 942a immediately after terminating the beacon transmit time period 940a. The initiating network device then initiates an acknowledgement (ACK) receive time period 968 to listen for an ACK message from the target network device indicating that the target network device received the message. Once the target network device receives the data packet message, it transmits the ACK message to the initiating network device during an ACK message transmit period 968a. If the initiating network device receives the ACK message, it returns to its previous default transmit/receive mode time slot. If the initiating network device does not receive the ACK message, it enters into a random back-off mode and will attempt to communicate with the target network device a predetermined number of times to try to confirm that the data packet message was received. If it is unsuccessful in its attempts to communicate with the target network device, the initiating network device will stop attempts and assume the connection has been lost.

FIG. 10 is an enlarged snapshot of subsequent sequential frames T100, T101 of the initiating network device and T100a, T101a of the target network device as shown generally at 862 in FIG. 8. When the initiating network device wants to subsequently communicate with the target network device, the initiating network device determines based on stored beacon timing information that it last heard the beacon from the network device ten minutes ago in the present example. As a result, the initiating network device can reduce the amount of time it must allocate to a subsequent beacon receive period 964' in order to receive the beacon from the target network device. As a result, the initiating network device can remain in the default sleep mode for a longer period of time and can therefore conserve more battery power than if it had to allocate a larger period of time for the beacon receive period 964' as it did for the beacon receive period 964 in FIG. 9.

According to the present invention, a communication device seeking to initiate communication with a target device within the asynchronous network determines timing information corresponding to the target device, in order to the synchronize the transmit mode of the initiating device with the receive mode of the target device. In one operational mode, the initiating device obtains the timing information from a mediation device that functions as an intermediary to facilitate communications among members of the asynchronous network. In another operational mode, the initiating device enters a listen state in order to receive signals directly from the target device, thereby obtaining the required timing information.

In a preferred embodiment, the initiating device first sends to the mediation device a communication request concerning the target device encoded within its beacon signal, and listens for a particular duration for a response from the mediation device. Preferably, a control parameter is configured to establish a maximum number of attempts for the transmit and listen sequence for obtaining timing information from the mediation device. Note that with this approach, a device within the network may be configured such that there is no attempt to obtain timing information from the mediation device. The initiating device accesses the control parameter to determine a maximum number of times for transmitting the communication request without receiving a corresponding response from the mediation device, and proceeds to attempt to communicate with the mediation device accordingly. Oftentimes, the mediation device is accessible and has the target device information. Accordingly, the mediation device receives the beacon signal containing the communication request from the initiating device, and in response, generates the timing information for communication with the target device, and transmits the timing information to the initiating device.

On occasion, the mediation device is not accessible, or in some manner, does not respond to the communication request with the required information. The initiating device determines that there is no response to the communication request according to the criteria established by the control parameter when no corresponding response is received to the communication request after transmitting the communication request the maximum number of times. In such cases, the initiating device listens to receive beacon signals directly from the target device. Upon receiving a beacon signal, the imitating device then derives timing information order to synchronize communications with the target device.

The present invention offers significant advantages over the prior art. By combining the concept of an intermediary device that facilitates communication among network devices with a selective direct access mode between two network devices, a communication protocol is provided that improves the accessibility of devices operating on asynchronous networks without the traditional infrastructure that typically provides synchronization.

While the above description is of the preferred embodiment of the present invention, it should be appreciated that the invention may be modified, altered, or varied without deviating from the scope and fair meaning of the following claims.

What is claimed is:

1. A method for establishing communication in an asynchronous network having first and second communication devices and a mediation device for facilitating communications among asynchronously operating communication devices, the method comprising the steps of:

asynchronously transmitting a communication request;

operating in one of first and second operating modes based on a control parameter;

asynchronously communicating with the mediation device in order to ascertain timing information in order to synchronize communications with a first communication device, when operating in the first operating mode;

listening to receive beacon signals directly from the first communication device in order to synchronize communications with the first communication device, when operating in the second operating mode;

after synchronizing, communicating between the first and the second communication device without further use of the mediation device to relay any communications between the first and the second communication device;

determining whether there is a response to the communication request according to a particular criteria;

when there is no response to the communication request according to the particular criteria, operating in the second operating mode; and wherein the step of communicating with the mediation device further comprises the step of transmitting a communication request to the mediation device which communication request includes information concerning the first communication device.

2. The method of claim 1, wherein the step of transmitting a communication request comprises the step of encoding the communication request in a beacon signal.

3. The method of claim 1, further comprising the steps of, at the second communication device:

accessing the control parameter to determine a maximum number of times for transmitting the communication request without receiving a corresponding response from the mediation device;

determining that there is no response to the communication request according to the particular criteria when no corresponding response is received to the communication request after transmitting the communication request the maximum number of times.

4. The method of claim 1, further comprising the steps of: at the mediation device:

receiving a beacon signal from the first communication device;

generating timing information for communication with the first communication device in response to receipt of the beacon signal;

receiving a communication request from the second communication device;

transmitting the timing information to the second communication device in response to the communication request.

5. A method for establishing communication in an asynchronous network having first and second communication devices and a mediation device for facilitating communications among asynchronously operating communication devices, the method comprising the steps of:

at the first communication device, periodically transmitting beacon signals using a communication frame having a transmit slot immediately followed by a receive slot;

at the second communication device:

periodically transmitting a beacon signal using a communication frame having a transmit slot immediately followed by a receive slot;

initiating communication with the first communication device, including the steps of:

(a) transmitting to the mediation device, a beacon signal that contains a communication request, the communication request including information concerning the first communication device;

(b) listening for a response from the mediation device to the communication request;

(c) upon receiving a response to the communication request, communicating with the first communication device using timing information derived from the response; and (d) upon receiving no response to the communication request, listening for beacon signals directly from the first communication device in order to synchronize communications with the first communication device.

6. The method of claim 5, further comprising the step of, at the second communication device, executing steps (a) and (b) a maximum number of times as established by a control parameter, prior to executing step (d).

7. The method of claim 6, further comprising the steps of: at the mediation device:

receiving a beacon signal from the first communication device;

generating timing information for communication with the first communication device in response to receipt of the beacon signal;

receiving a communication request from the second communication device;

transmitting the timing information to the second communication device in response to the communication request.

8. A method of communication in an asynchronous network between an initiating device and a target device, the network having a mediation device for facilitating communications among asynchronously operating communication devices, the method comprising the steps of:

at the initiating device:

transmitting a communication request, targeted at the mediation device, for information needed to ascertain timing information pertaining to the target device in order to synchronize communications with the target device;

determining whether there is a response to the communication request according to a particular criteria;

when there is no response to the communication request according to the particular criteria, operating in a listening mode to receive beacon signals directly from the target device in order to synchronize communications with the target device; and when there is a response to the communication request according to the particular criteria, synchronizing communications with the target device using timing information derived from the response.

9. The method of claim 8, further comprising the steps of:

at the target device, periodically waking up from a sleep mode to transmit beacon signals and to listen for a response signal; and at the mediation device:

receiving a beacon signal from the target device;

generating timing information for communication with the target device in response to receipt of the beacon signal;

receiving a communication request from the initiating device;

transmitting the timing information to the initiating device in response to the communication request.

10. A method of asynchronously communicating with a target wireless device, comprising:

occasionally entering a first wake up mode from a default sleep mode to transmit a beacon signal and to listen for device transmissions;

entering a second wake up mode to transmit a message to a target wireless device, and during the second wake up mode:

transmitting a communication request concerning the target wireless device to a mediation device that facilitates communication among asynchronously operating communication devices;

listening for a response to the communication request from the mediation device;

upon obtaining a response according to a predefined criteria, communicating with the target wireless device using timing information contained within the response;

upon not obtaining a response according to the predefined criteria, entering an active wait mode to receive communication directly from the target wireless device;

reverting to the default sleep mode upon termination of either the first or the second wake up mode.

* * * * *